United States Patent
Hong et al.

(10) Patent No.: US 10,301,210 B2
(45) Date of Patent: May 28, 2019

(54) APPARATUS FOR MOLDING GLASS SUBSTRATE AND METHOD OF MOLDING GLASS SUBSTRATE

(71) Applicants: SAMSUNG DISPLAY CO., LTD., Yongin-si, Gyeonggi-do (KR); DOWOOINSYS. CO., LTA., Cheongju-si, Chungcheongbuk-do (KR)

(72) Inventors: Daesik Hong, Cheonan-si (KR); Bonki Koo, Cheongju-si (KR); Dongsun Kim, Seongnam-si (KR); Jinseok Jang, Asan-si (KR); Youngkuil Joo, Asan-si (KR)

(73) Assignees: Samsung Display Co., Ltd., Yongin-si (KR); Dowooinsys. Co., Lta., Cheongju-si (KR)

( * ) Notice: Subject to any disclaimer, the term of this patent is extended or adjusted under 35 U.S.C. 154(b) by 275 days.

(21) Appl. No.: 15/141,792

(22) Filed: Apr. 28, 2016

(65) Prior Publication Data
US 2016/0318788 A1    Nov. 3, 2016

(30) Foreign Application Priority Data
Apr. 30, 2015 (KR) .................. 10-2015-0061144

(51) Int. Cl.
*C03B 23/035* (2006.01)
*C03B 23/00* (2006.01)
(Continued)

(52) U.S. Cl.
CPC ...... *C03B 23/0357* (2013.01); *C03B 23/0235* (2013.01); *C03B 23/0258* (2013.01); *C03B 35/145* (2013.01)

(58) Field of Classification Search
CPC . C03B 23/023; C03B 23/0235; C03B 23/025; C03B 23/0256; C03B 23/0258; C03B 23/035; C03B 23/0357
See application file for complete search history.

(56) References Cited

U.S. PATENT DOCUMENTS 5,782,947 A * 7/1998 Boaz ............... C03B 23/0235
219/678
6,422,040 B1 * 7/2002 McMaster ........... C03B 23/0307
65/106
(Continued)

FOREIGN PATENT DOCUMENTS

JP          06115960 A  *  4/1994  ......... C03B 23/0302
KR   10-2013-0108257 A   10/2013
(Continued)

*Primary Examiner* — Queenie S Dehghan
(74) *Attorney, Agent, or Firm* — Lewis Roca Rothgerber Christie LLP

(57) ABSTRACT

There is provided an apparatus for molding a glass substrate, the apparatus including a pre-heating unit, a molding unit, and a cooling unit sequentially arranged, wherein the pre-heating unit includes a pre-heating body and a glass substrate holder, wherein the molding unit includes: a molding body having a vacuum port, a molding support on the molding body, the molding support being configured to support an edge of a glass substrate, and a heating element configured to heat the molding body, and wherein the cooling unit includes a cooling body and a cooling plate.

7 Claims, 7 Drawing Sheets

(51) Int. Cl.
    *C03B 23/023*     (2006.01)
    *C03B 35/14*     (2006.01)
    *C03B 23/025*     (2006.01)

(56) References Cited

U.S. PATENT DOCUMENTS

| | | | |
|---|---|---|---|
| 2008/0190143 A1* | 8/2008 | Balduin | C03B 23/0252 65/106 |
| 2012/0216573 A1 | 8/2012 | Dannoux et al. | |
| 2013/0125588 A1* | 5/2013 | Kladias | C03B 23/0258 65/103 |
| 2014/0144182 A1 | 5/2014 | Dannoux et al. | |
| 2014/0290309 A1* | 10/2014 | Chang | C03B 23/0357 65/25.4 |
| 2014/0299300 A1 | 10/2014 | Bailey et al. | |
| 2015/0329402 A1* | 11/2015 | Afzal | C03B 23/0235 65/348 |

FOREIGN PATENT DOCUMENTS

| | | |
|---|---|---|
| KR | 10-2014-0015383 A | 2/2014 |
| KR | 10-2014-0039216 A | 4/2014 |
| KR | 10-2014-0059488 A | 5/2014 |

* cited by examiner

APPARATUS FOR MOLDING GLASS SUBSTRATE AND METHOD OF MOLDING GLASS SUBSTRATE

CROSS-REFERENCE TO RELATED APPLICATION

This application claims priority to and the benefit of Korean Patent Application No. 10-2015-0061144, filed on Apr. 30, 2015, with the Korean Intellectual Property Office (KIPO), the disclosure of which is incorporated herein in its entirety by reference.

BACKGROUND

1. Field

Embodiments of the present invention relate to an apparatus for molding a glass substrate and a method of molding a glass substrate.

2. Description of the Related Art

In recent times, display devices for displaying images using liquid crystal display ("LCD") panels, plasma display panels ("PDP"), electroluminescent display ("ELD") panels, and organic light emitting diode ("OLED") display panels are gaining attention. Such a display device may be provided in a planar or curved shape.

To manufacture a curved display device, a curved window is required. Such a curved window may be obtained through a press molding process in which a glass substrate is press-molded using a contact mold. However, during such a contact press molding process, a surface of the glass substrate may be damaged. Accordingly, research is being conducted on various methods and apparatuses for molding a glass substrate without incurring damage to a surface of the glass substrate.

It is to be understood that this background of the technology section is intended to provide useful background for understanding the subject matter disclosed herein, the technology background section may include ideas, concepts or recognitions that were not part of what was known or appreciated by those skilled in the pertinent art prior to a corresponding effective filing date of subject matter disclosed herein.

SUMMARY

Aspects of embodiments of the present invention are directed to an apparatus for molding a glass substrate capable of significantly reducing damage to a glass substrate during a molding process by reducing a contact area between the glass substrate and a molding unit.

Aspects of embodiments of the present invention are also directed to a method of molding a glass substrate capable of significantly reducing damage to a glass substrate.

According to an exemplary embodiment of the present invention, there is provided an apparatus for molding a glass substrate, the apparatus including: a pre-heating unit, a molding unit, and a cooling unit sequentially arranged, wherein the pre-heating unit includes a pre-heating body and a glass substrate holder, wherein the molding unit includes: a molding body having a vacuum port; a molding support on the molding body, the molding support being configured to support an edge of a glass substrate; and a heating element configured to heat the molding body, and wherein the cooling unit includes a cooling body and a cooling plate. In an embodiment, the apparatus further includes a microwave radiator above the molding unit.

In an embodiment, the microwave radiator is configured to generate microwaves having a frequency in a range of about 2.0 GHz to about 3.0 GHz.

In an embodiment, the molding support includes a dielectric heating layer.

In an embodiment, the dielectric heating layer includes at least one of a carbon black-based dielectric heating material and a silicon carbide-based dielectric heating material.

In an embodiment, the apparatus further includes a far-infrared radiator above the molding unit.

In an embodiment, the far-infrared radiator is configured to radiate a far infrared ray having a wavelength in a range of about 1 μm to about 2 μm.

In an embodiment, the apparatus further includes: a transfer rail over the pre-heating unit, the molding unit, and the cooling unit and extending thereacross; and a transfer unit on the transfer rail.

In an embodiment, the transfer unit includes: a first transfer unit between the pre-heating unit and the molding unit; and a second transfer unit between the molding unit and the cooling unit.

In an embodiment, each of the first transfer unit and the second transfer unit each includes: an absorption jig having the vacuum port; and an absorption jig heater.

According to an exemplary embodiment of the present invention, there is provided a method of molding a glass substrate, the method including: pre-heating a glass substrate; arranging the pre-heated glass substrate on the molding unit; heating an edge of the glass substrate on the molding unit; molding the glass substrate by vacuum-sagging the heated glass substrate to allow the edge of the glass substrate to be curved; and cooling the molded glass substrate, wherein the molding unit includes a molding support configured to support the edge of the glass substrate, and the edge of the glass substrate is mounted on the molding support.

In an embodiment, the heating includes radiating microwaves toward the molding support.

In an embodiment, the molding support includes a dielectric heating layer, and the microwaves are irradiated toward the dielectric heating layer.

In an embodiment, the microwave has a frequency in a range of about 2.0 GHz to about 3.0 GHz.

In an embodiment, the heating includes radiating a far infrared ray toward the glass substrate.

In an embodiment, the far infrared ray has a wavelength in a range of about 1 μm to about 2 μm.

In an embodiment, the method further includes: transferring the molded glass substrate to a cooling plate for cooling the glass substrate, subsequently to the molding, wherein the transferring includes absorbing the molded glass substrate using an absorption jig having a vacuum port.

In an embodiment, the transferring includes heating the absorption jig up to a temperature in a range of about 450° C. to about 550° C.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the present disclosure of invention will be more clearly understood from the following detailed description taken in conjunction with the accompanying drawings, in which.

DETAILED DESCRIPTION

Figure 1:
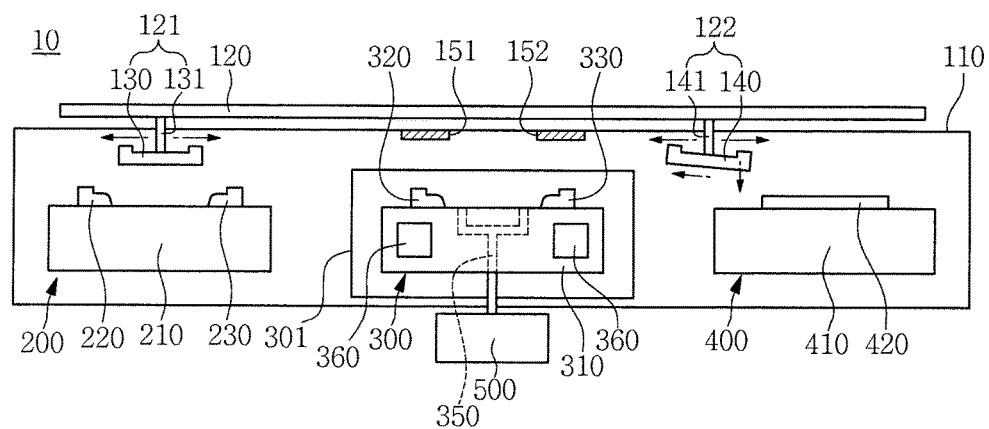
FIG. 1 is a schematic view illustrating an apparatus for molding a glass substrate according to a first exemplary embodiment.

Exemplary embodiments will now be described more fully hereinafter with reference to the accompanying drawings; however, they can be embodied in different forms and should not be construed as limited to the exemplary embodiments set forth herein. Rather, these exemplary embodiments are provided so that this disclosure will be thorough and complete, and will fully convey exemplary implementations to those skilled in the art.

All terminologies used herein are merely used to describe exemplary embodiments and can be modified according to the relevant art and the intention of an applicant. Therefore, the terms used herein should be interpreted as having a meaning that is consistent with their meanings in the context of the present disclosure, and is not intended to limit the exemplary embodiments.

In the drawings, certain elements or shapes can be simplified or exaggerated to better illustrate the described technology, and other elements present in an actual product can also be omitted. Thus, the drawings are intended to facilitate the understanding of the described technology. Like reference numerals refer to like elements throughout the specification.

Hereinafter, a first exemplary embodiment will be described with reference to FIGS. 1 through 3.

FIG. 1 is a schematic view illustrating an apparatus 10 for molding a glass substrate according to the first exemplary embodiment. The apparatus 10 for molding the glass substrate according to the first exemplary embodiment may include a pre-heating unit 200, a molding unit 300, and a cooling unit 400 that are sequentially arranged.

The pre-heating unit 200, the molding unit 300, and the cooling unit 400 may be disposed within an apparatus frame 110. The apparatus frame 110 may include an insulating material. The apparatus frame 110 may serve to protect and insulate the pre-heating unit 200, the molding unit 300, and the cooling unit 400 from an external environment.

The pre-heating unit 200 may include a pre-heating body 210 and glass substrate holders 220 and 230. In addition, the pre-heating unit 200 may include a heating element. The heating element may be disposed within or separately from the pre-heating body 210.

The glass substrate 101 may be placed on the glass substrate holders 220 and 230, and may be pre-heated by the pre-heating unit 200 up to a temperature in a range of about 300° C. to about 500° C. However, the first exemplary embodiment is not limited thereto, and the glass substrate 101 may be pre-heated up to a temperature of less than about 300° C. or more than about 500° C.

The molding unit 300 may be disposed adjacent to the pre-heating unit 200. The molding unit 300 may mold the pre-heated glass substrate 101.

According to the first exemplary embodiment, the molding unit 300 may be disposed within a molding chamber 301. The molding chamber 301 may protect the molding unit 300 and may form vacuum to be used for the molding of the glass substrate 101. In addition, the molding chamber 301 may serve to block microwaves.

Figure 2:
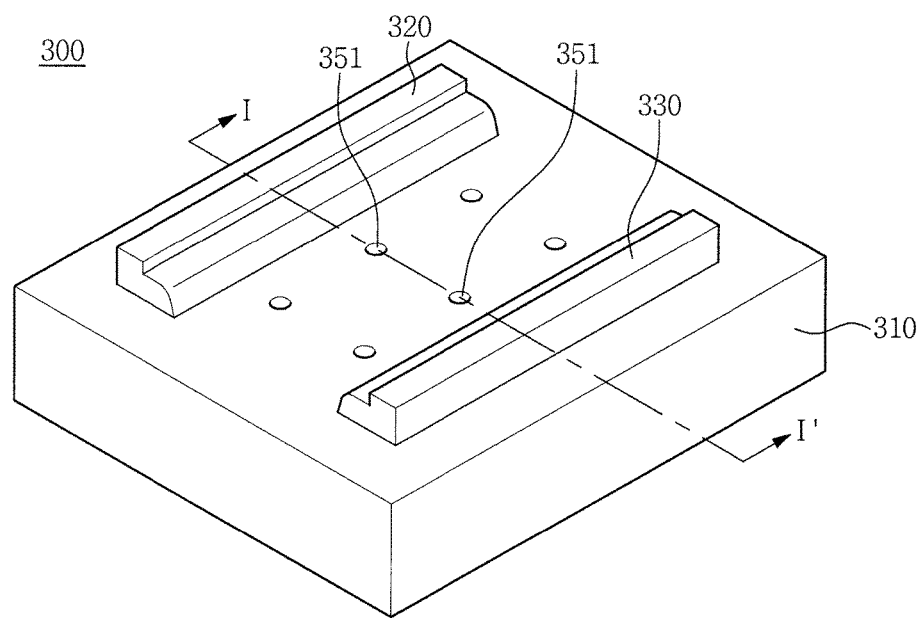
FIG. 2 is a perspective view illustrating a molding unit of the apparatus for molding the glass substrate of FIG. 1.
Figure 3:
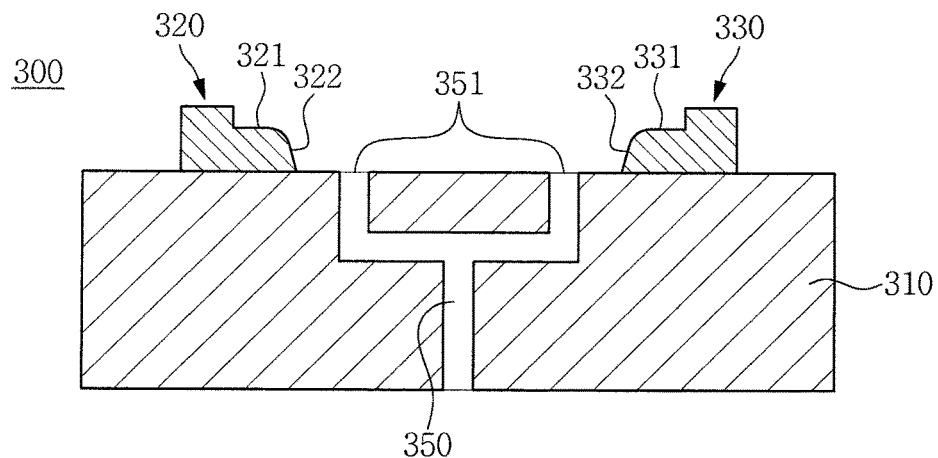
FIG. 3 is a cross-sectional view taken along the line I-I' of FIG. 2.

FIG. 2 is a perspective view illustrating the molding unit 300 of the apparatus 10 for molding the glass substrate 101 of FIG. 1. FIG. 3 is a cross-sectional view taken along the line I-I' of FIG. 2.

The molding unit 300 may include a molding body 310 having at least a vacuum port 350 and molding supports 320 and 330 on the molding body 310. The molding supports 320 and 330 may support edges of the pre-heated glass substrate 101.

The molding unit 300 may include a heating element 360 configured to heat the molding body 310. According to the first exemplary embodiment, the heating element 360 may be disposed within the molding body 310. The heating element 360 may heat the molding unit 300 up to a temperature in a range of about 500° C. to about 650° C. However, the first exemplary embodiment is not limited thereto, and the molding unit 300 may be heated up to a temperature of less than about 500° C. or more than about 650° C.

The vacuum port 350 may be connected to a vacuum pump 500. According to the first exemplary embodiment, the vacuum pump 500 may be disposed outside of the apparatus frame 110. In addition, the vacuum port 350 may be connected to an absorption hole 351 formed in a surface of the molding body 310. A low-pressure environment may be formed in a space between the molding supports 320 and 330 by the vacuum pump 500, and the glass substrate 101 may be molded due to the low-pressure environment. As used herein, a low-pressure state of less than or equal to about 0.5 atm may be defined as vacuum.

The glass substrate 101 may be mounted on the molding supports 320 and 330. The edges of the glass substrate 101 may be supported by the molding supports 320 and 330, respectively. The molding supports 320 and 330 may include mounting surfaces 321 and 331 and inclined surfaces 322 and 332 having a mild inclination, respectively. The edges of the glass substrate 101 may be mounted on the mounting surfaces 321 and 331, respectively.

According to the first exemplary embodiment, the glass substrate 101 may be molded in a state in which the edges of the glass substrate 101, which are supported by the molding supports 320 and 330, are selectively heated, whereby the edges of the glass substrate 101 are curved.

For the selective heating of the edges of the glass substrate 101, microwave radiators 151 and 152 may be disposed above the molding unit 300.

The microwave radiators 151 and 152 may be disposed inside or outside of the apparatus frame 110. According to the first exemplary embodiment, the two microwave radiators 151 and 152 may be disposed above the molding supports 320 and 330, respectively, within the apparatus frame 110. In addition, a window may be disposed on an upper wall of the molding chamber 301 so as to allow microwaves to be transmitted therethrough.

Meanwhile, in a case in which the microwave radiators 151 and 152 are disposed outside of the apparatus frame 110, a window may be disposed on an upper wall of the apparatus frame 110 so as to allow microwaves to be transmitted therethrough.

The microwave radiators 151 and 152 may radiate microwaves having a frequency in a range of about 300 MHz to about 300 GHz, to the molding supports 320 and 330. According to the first exemplary embodiment, the microwave radiators 151 and 152 may generate microwaves having a frequency in a range of about 2.0 GHz to about 3.0 GHz, which is industrially usable. More particularly, the microwave radiators 151 and 152 may generate microwaves having a frequency in a range of about 2.4 GHz to about 2.5 GHz.

The molding supports 320 and 330 may include a dielectric heating layer 336 which can be heated by microwaves. The dielectric heating layer 336 may include a dielectric heating material. The dielectric heating layer 336 may be formed of a dielectric heating material known in the pertinent art. The type of dielectric heating material is not particularly limited, and by way of example, a carbon black-based dielectric heating material or a silicon carbide-based dielectric heating material may be used.

The microwave generated in the microwave radiators 151 and 152 may be irradiated to the dielectric heating layer 336 to heat the dielectric heating layer 336, thereby selectively heating the edges of the glass substrate 101.

Figure 4A:
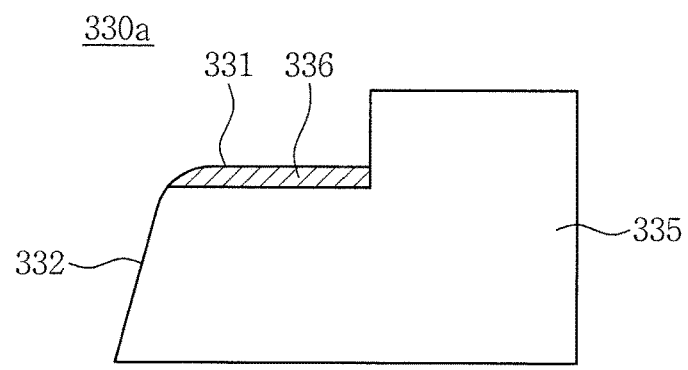
FIGS. 4A-4B are cross-sectional views illustrating molding supports, respectively.
Figure 4B:
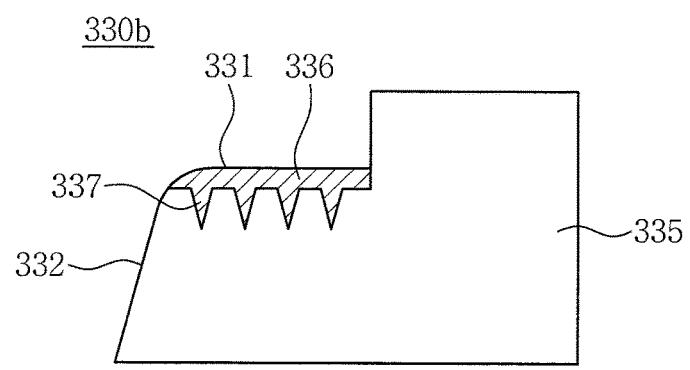

FIGS. 4A and 4B are cross-sectional views illustrating molding supports 330a and 330b, respectively.

Referring to FIG. 4A, the molding support 330a may include a support body 335 and a dielectric heating layer 336 on a cut-out portion of the support body 335. The dielectric heating layer 336 may be formed by depositing or coating a dielectric heating material on the cut-out portion of the support body 335. An upper surface of the dielectric heating layer 336 may be a mounting surface 331, and the mounting surface 331 may be connected to an inclined surface 332.

Referring to FIG. 4B, the molding support 330b may include a wedge portion 337 formed below a dielectric heating layer 336. The dielectric heating layer 336 may be stably fixed to a support body 335 by the wedge portion 337.

Subsequently to the edges of the glass substrate 101 being selectively heated by the dielectric heating layers 336 on the molding supports 320 and 330, a low-pressure environment may be formed in a space between the molding supports 320 and 330 by the vacuum pump 500. In the low-pressure environment, the glass substrate 101 may be sagged by its own weight and a vacuum absorption force, whereby a glass substrate 102 including curved edges may be obtained.

In such a case in which the glass substrate 101 is molded by the apparatus 10 for molding the glass substrate according to the first exemplary embodiment, a surface of the glass substrate 101 may suffer less damage because only the edges of the glass substrate 101 contact the molding unit 300, as compared to a scheme in which a mold is disposed over an entire surface of the glass substrate 101 and a pressure is applied thereto to mold the glass substrate 101.

The cooling unit 400 may be disposed adjacent to the molding unit 300. The cooling unit 400 may cool the glass substrate 102, which is molded in the molding unit 300.

The cooling unit 400 may include a cooling body 410 and a cooling plate 420 on the cooling body 410. The glass substrate 102 molded in the molding unit 300 may be cooled by the cooling plate 420.

The cooling unit 400 may further include a temperature adjuster for adjusting a temperature of the cooling body 410. A temperature of the cooling plate 420 may be adjusted by the temperature adjustment performed by the cooling body 410, whereby a cooling speed of the molded glass substrate 102 may be adjusted.

In general, the molded glass substrate 102 is cooled by a two-stage cooling process. Accordingly, the temperature adjuster may adjust the temperature of the cooling body 410 through at least two stages.

For example, a temperature of the cooling plate 420 for a primary cooling may be adjusted to a temperature in a range of about 450° C. to about 500° C., and a temperature of the cooling plate 420 for a secondary cooling may be adjusted to a temperature in a range of about 250° C. to about 300° C. However, the first exemplary embodiment is not limited thereto, and the temperature of the cooling plate 420 may vary based on the type, thickness, and purpose of use of the glass substrate 101.

A transfer rail 120 may be disposed upwardly of the apparatus frame 110. The transfer rail 120 may be disposed to be in contact with or spaced apart from the apparatus frame 110.

The transfer rail 120 may be disposed over the pre-heating unit 200, the molding unit 300, and the cooling unit 400 while extending thereacross. In other words, the transfer rail 120 may pass over the pre-heating unit 200, the molding unit 300, and the cooling unit 400.

Transfer units 121 and 122 may be disposed on the transfer rail 120.

The transfer units 121 and 122 may transfer the glass substrate 101 or the molded glass substrate 102.

For example, the transfer unit may include a first transfer unit 121 between the pre-heating unit 200 and the molding unit 300, and a second transfer unit 122 between the molding unit 300 and the cooling unit 400.

The first transfer unit 121 may transfer the glass substrate 101, which is pre-heated in the pre-heating unit 200, to the molding unit 300. In addition, the second transfer unit 122 may transfer the glass substrate 102, which is molded in the molding unit 300, to the cooling unit 400.

The first transfer unit 121 may include a moving module 131 fastened to the transfer rail 120, an absorption jig 130 connected to the moving module 131, and an absorption jig heater 143 for heating the absorption jig 130. The second transfer unit 122 may include a moving module 141 fastened to the transfer rail 120, an absorption jig 140 connected to the moving module 141, and an absorption jig heater 143 for heating the absorption jig 140.

Figure 5:
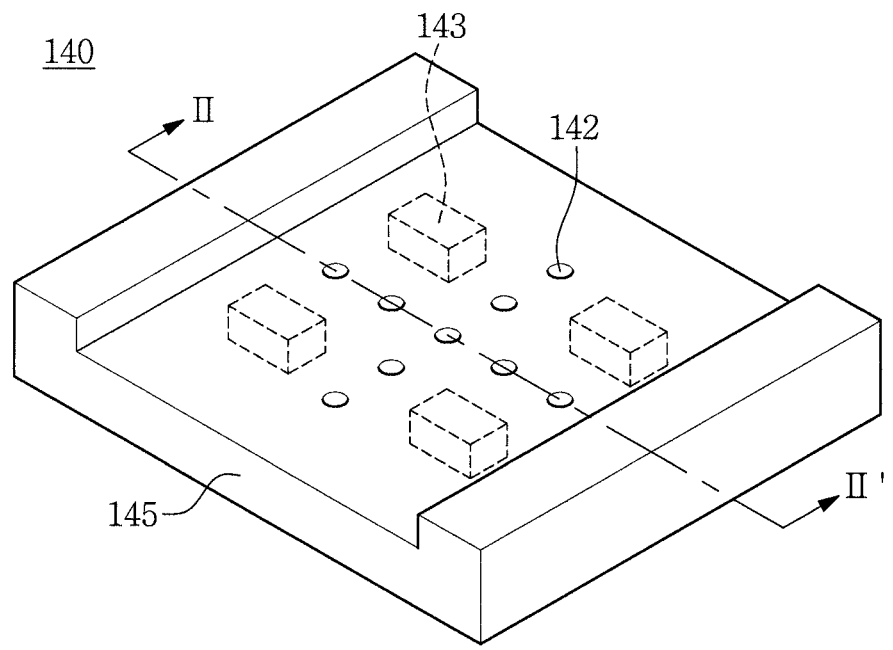
FIG. 5 is a perspective view illustrating an absorption jig of the apparatus for molding the glass substrate of FIG. 1.
Figure 6A:
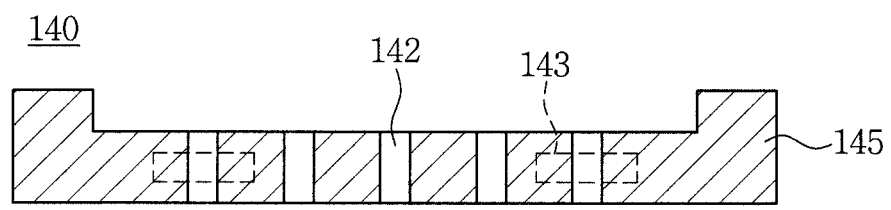
FIG. 6A is a cross-sectional view taken along the line II-II' of FIG. 5.
Figure 6B:
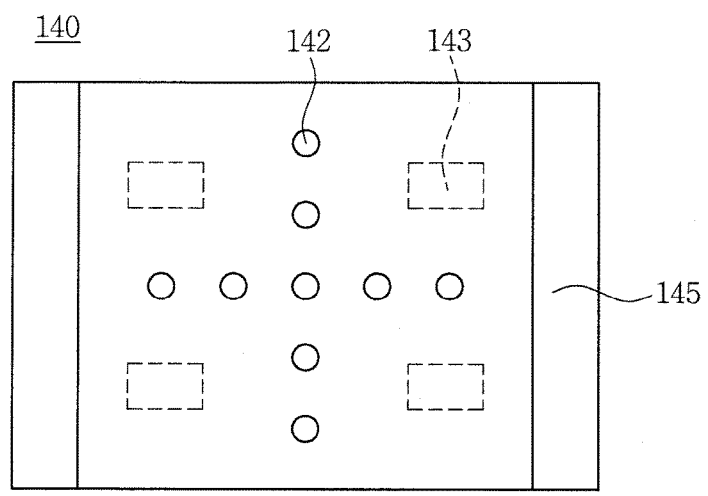
FIG. 6B is a plan view of FIG. 5.

FIG. 5 is a perspective view illustrating the absorption jig 140 of the apparatus 10 for molding the glass substrate of FIG. 1. FIG. 6A is a cross-sectional view taken along the line II-II' of FIG. 5. FIG. 6B is a plan view of FIG. 5.

Referring to FIG. 5, the absorption jig 140 of the second transfer unit 122 may include an absorption body 145 and a vacuum port 142 formed in the absorption body 145. In addition, the absorption jig heater 143 may be disposed within the absorption body 145.

The vacuum port 142 formed in the absorption body 145 may be connected to a vacuum pump, and the absorption jig 140 may absorb the molded glass substrate 102 using a vacuum absorption force. Similarly, the absorption jig 130 of the first transfer unit 121 may absorb the glass substrate 102 using a vacuum absorption force.

The moving modules 131 and 141 may adjust a height of the absorption jigs 130 and 140 and may move the absorption jigs 130 and 140.

Hereinafter, an operation mechanism of the second transfer unit 122 for transferring the glass substrate 102 molded in the molding unit 300 to the cooling unit 400 will be described.

The second transfer unit 122 is moved over to the molding unit 300 by the moving module 141. The moving module 141 lowers the absorption jig 140, and the absorption jig 140 brings close (e.g., absorbs) the molded glass substrate 102 using a vacuum absorption force.

Here, in a case in which a temperature difference between the absorption jig 140 and the molded glass substrate 102 is great, the molded glass substrate 102 may be damaged. To prevent such damage, the absorption jig 140 is heated up to the same or similar temperature as a temperature of the molded glass substrate 102. The absorption jig heater 143 is used to heat the absorption jig 140.

When the molded glass substrate 102 is absorbed to the absorption jig 140 (e.g., brought close to the absorption jig 140 through suction), the moving module 141 raises the absorption jig 140 so as to allow the molded glass substrate 102 to be completely separated from the molding unit 300. The moving module 141 moves the second transfer unit 122 over to the cooling unit 400.

When the second transfer unit 122 is moved over to the cooling unit 400, the moving module 141 lowers the absorption jig 140 so as to bring the absorption jig 140 adjacent to the cooling plate 420 of the cooling unit 400. Vacuum of the absorption jig 140 is released such that the molded glass substrate 102 is disposed on the cooling plate 420 of the cooling unit 400. The molded glass substrate 102 is cooled by the cooling unit 400.

Hereinafter, a second exemplary embodiment will be described with reference to FIG. 7. A repetitive description of the components in the foregoing may be omitted herein for sake of conciseness.

Figure 7:
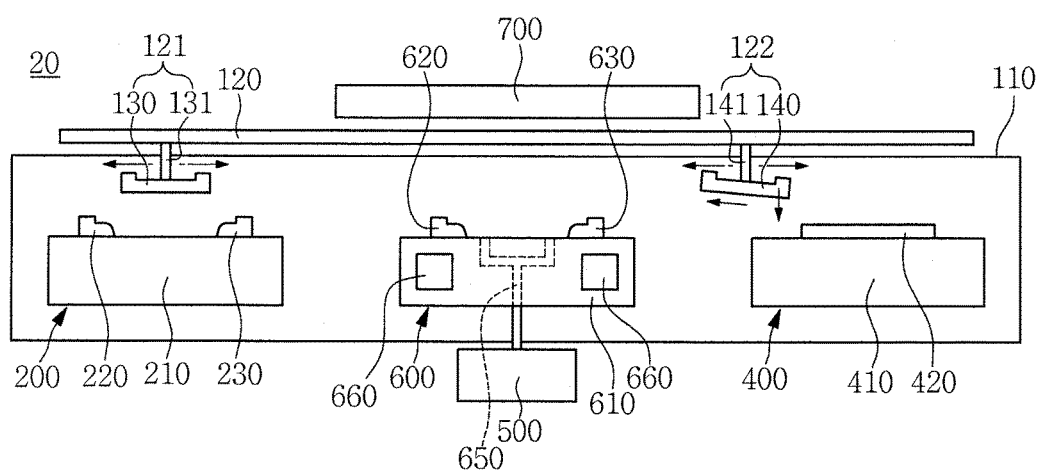
FIG. 7 is a schematic view illustrating an apparatus for molding a glass substrate according to a second exemplary embodiment.

FIG. 7 is a schematic view illustrating an apparatus 20 for molding a glass substrate according to the second exemplary embodiment.

The apparatus 20 for molding the glass substrate according to the second exemplary embodiment may include a pre-heating unit 200, a molding unit 600, and a cooling unit 400 that are sequentially disposed.

The molding unit 600 may include a molding body 610 having at least a vacuum port 650, and molding supports 620 and 630 on the molding body 610. The molding supports 620 and 630 may support edges of a pre-heated glass substrate 101.

The molding unit 600 may include a heating element 660 configured to heat the molding body 610. The vacuum port 650 may be connected to a vacuum pump 500.

The apparatus 20 for molding the glass substrate according to the second exemplary embodiment may include a far-infrared radiator 700 above the molding unit 600. The apparatus 20 for molding the glass substrate according to the second exemplary embodiment may heat the glass substrate 101 using a far infrared ray.

The far-infrared radiator 700 may radiate far infrared rays to the glass substrate 101. A wavelength of the far infrared ray generated in the far-infrared radiator 700 is not particularly limited. According to the second exemplary embodiment, the far-infrared radiator 700 may radiate far infrared rays having a wavelength in a range of about 1 μm to about 2 μm, to the glass substrate 101.

The far-infrared radiator 700 may be disposed inside or outside of an apparatus frame 110. According to the second exemplary embodiment, the far-infrared radiator 700 may be disposed outside of the apparatus frame 110. In this case, a window may be disposed on an upper wall of the apparatus frame 110 so as to allow the far infrared ray generated in the far-infrared radiator 700 to be transmitted therethrough.

Hereinafter, a method of molding a glass substrate using the apparatus 10 for molding the glass substrate according to the first exemplary embodiment will be described with reference to FIGS. 8A through 8E.

FIGS. 8A through 8E are views illustrating sequential processes of the method of molding the glass substrate 101.

Figure 8A:
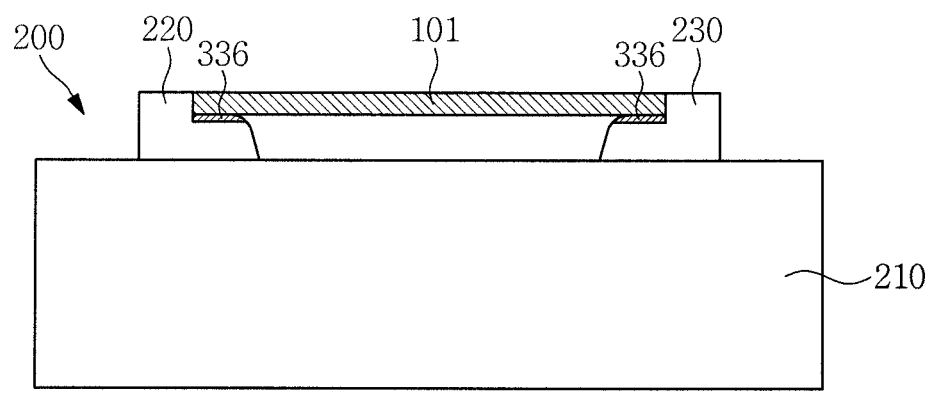
FIGS. 8A-8E are views illustrating sequential processes of a method of molding a glass substrate.

Referring to FIG. 8A, the glass substrate 101 is pre-heated by the pre-heating unit 200.

In the pre-heating process, the glass substrate 101 is pre-heated up to a temperature in a range of about 300° C. to about 500° C.

The pre-heated glass substrate 101 is transferred to the molding unit 300 by the first transfer unit 121. In this instance, the transferring process is performed in a state in which the pre-heated glass substrate 101 is absorbed to the absorption jig 130 of the first transfer unit 121.

The pre-heated glass substrate 101 is placed on the molding supports 320 and 330 of the molding unit 300. In this instance, the molding unit 300 is in a state of being heated up to a temperature in a range of about 500° C. to about 650° C.

Figure 8B:
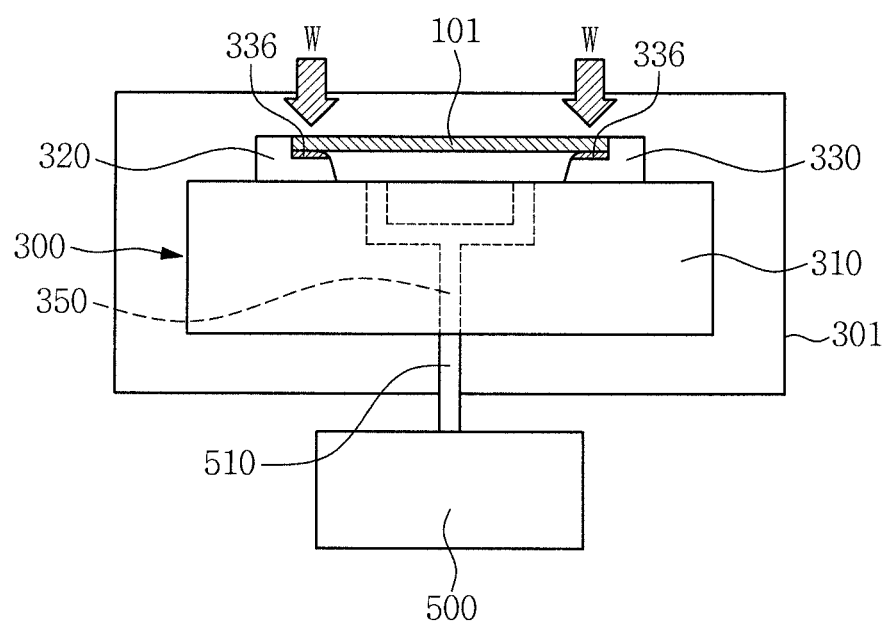

Referring to FIG. 8B, microwaves W are irradiated to the molding supports 320 and 330 supporting the edges of the glass substrate 101.

The microwaves W are generated from the microwave radiators 151 and 152 to be irradiated to the molding supports 320 and 330. For example, the molding supports 320 and 330 include the dielectric heating layers 336, respectively. The microwave W is irradiated to the dielectric heating layer 336, thereby heating the dielectric heating layer 336. Accordingly, the edges of the glass substrate 101 are heated.

The microwave W may have a frequency in a range of about 2.0 GHz to about 3.0 GHz, and more particularly, in a range of about 2.4 GHz to about 2.5 GHz.

The glass substrate 101, of which the edges are heated, undergoes vacuum-sagging.

To perform the vacuum-sagging process, the vacuum pump 500 is used.

The molding body 310 of the molding unit 300 includes at least a vacuum port 350, and the vacuum port 350 is connected to the vacuum pump 500. A low-pressure environment is formed in a space between the molding supports 320 and 330 by the vacuum pump 500, such that the glass substrate 101 is molded by the low-pressure environment. For the vacuum-sagging, a low-pressure state of less than or equal to about 0.5 atm may be provided, more particularly, less than or equal to about 0.1 atm.

Figure 8C:
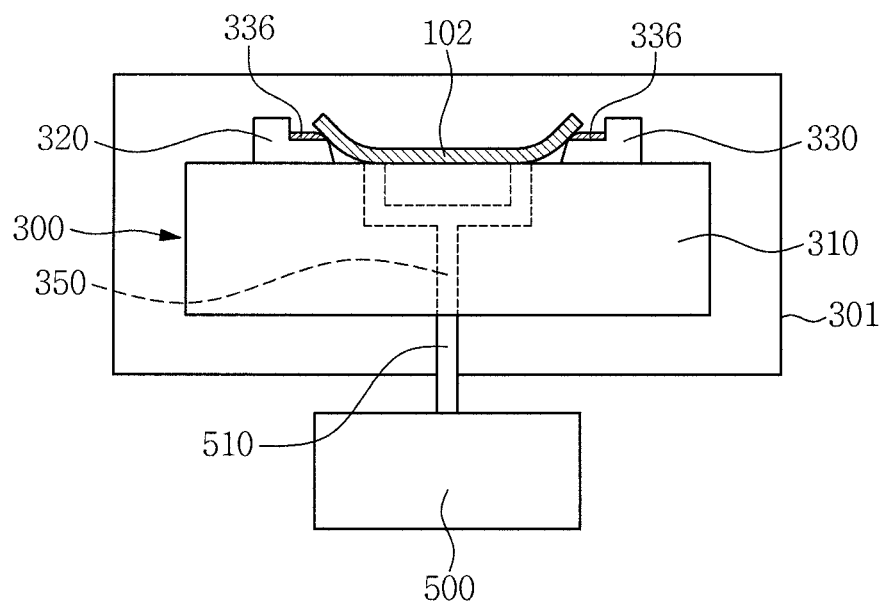

Referring to FIG. 8C, the glass substrate 101 is sagged downwardly between the molding supports 320 and 330 by its own weight and a vacuum absorption force of the vacuum pump 500, whereby the edges of the glass substrate 101 are curved. Accordingly, the glass substrate 102 having the curved edges is obtained.

Figure 8D:
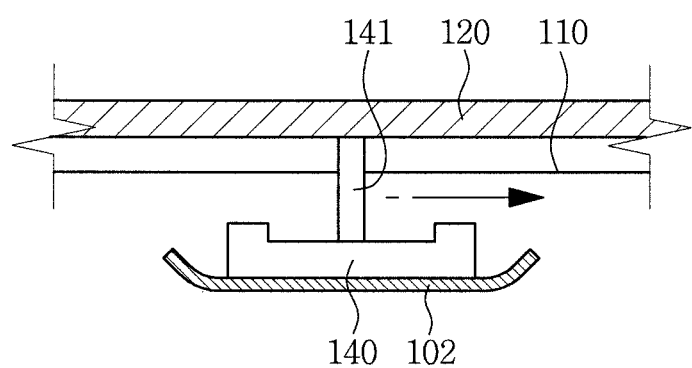

Referring to FIG. 8D, the molded glass substrate 102 is transferred to the cooling unit 400 by the second transfer unit 122.

To transfer the molded glass substrate 102, the second transfer unit 122 is used. For example, the second transfer unit 122 is moved over to the molding unit 300, and the absorption jig 140 brings close (e.g., absorbs) the glass substrate 102 using a vacuum absorption force.

In this instance, the absorption jig 140 is heated up to a temperature in a range of about 450° C. to about 550° C. The heating temperature of the absorption jig 140 may vary based on a temperature of the molded glass substrate 102. According to embodiments, the absorption jig 140 may be heated up to a temperature of less than about 450° C. or more than about 550° C.

When the molded glass substrate 102 is absorbed to the absorption jig 140, the second transfer unit 122 is moved over to the cooling unit 400.

Subsequently to the second transfer unit 122 being moved over to the cooling unit 400, the vacuum of the absorption jig 140 is released, such that the molded glass substrate 102 is disposed on the cooling plate 420 of the cooling unit 400.

Figure 8E:
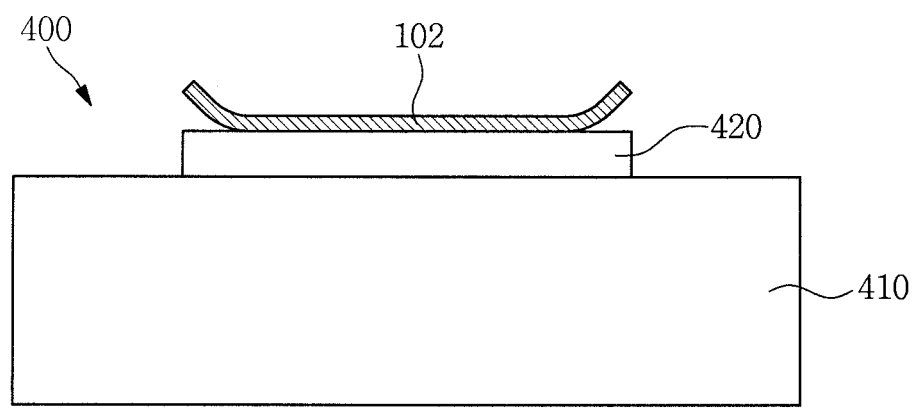

Referring to FIG. 8E, the molded glass substrate 102 is cooled on the cooling plate 420 of the cooling unit 400.

The cooling process may include a primary cooling of the molded glass substrate 102 and a secondary cooling of the cooled molded glass substrate 102. In other words, the molded glass substrate 102 is gradually cooled by the cooling unit 400.

A temperature of the cooling plate 420 for the primary cooling may be adjusted to a temperature in a range of about 450° C. to about 500° C., and a temperature of the cooling plate 420 for the secondary cooling may be adjusted to a temperature in a range of about 250° C. to about 300° C.

A tertiary cooling may be performed as desired, and an intermediate cooling may be performed between the primary cooling and the secondary cooling.

The temperature of the cooling plate 420 may vary based on a composition, thickness, size, and purpose of use of the molded glass substrate 102.

The molded glass substrate 102, which has undergone the secondary cooling, is discharged from the apparatus 10 for molding the glass substrate.

In addition, the glass substrate 101 may be molded by the apparatus 20 for molding the glass substrate according to the second exemplary embodiment. In the case that the glass substrate 101 is molded by the apparatus 20 for molding the glass substrate according to the second exemplary embodiment, a far infrared ray may be irradiated to the glass substrate 101. The far infrared ray may have a wavelength in a range of about 1 μm to about 2 μm.

As set forth above, according to one or more exemplary embodiments, the apparatus for molding the glass substrate may reduce damage to a surface of the glass substrate, as compared to a press molding scheme in which a glass substrate is press-molded.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "below", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" other elements or features would then be oriented "above" the other elements or features. Thus, the example term "below" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. When an element or layer is referred to as being "directly on," "directly connected to", "directly coupled to", or "immediately adjacent to" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112, first paragraph, and 35 U.S.C. § 132(a).

The apparatus for molding a glass substrate and/or any other relevant devices or components according to embodiments of the present invention described herein may be implemented utilizing any suitable hardware, firmware (e.g. an application-specific integrated circuit), software, or a suitable combination of software, firmware, and hardware. Further, the various components of the apparatus for molding a glass substrate may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

From the foregoing, it will be appreciated that various embodiments in accordance with the present disclosure have been described herein for purposes of illustration, and that various modifications may be made without departing from the scope and spirit of the present teachings, as defined by the following claims and equivalents thereof. Accordingly, the various embodiments disclosed herein are not intended to be limiting of the true scope and spirit of the present teachings. Various features of the above described and other embodiments can be mixed and matched in any manner, to produce further embodiments consistent with the invention.

What is claimed is:

1. An apparatus for molding a glass substrate, the apparatus comprising:
   a pre-heating unit, a molding unit, and a cooling unit sequentially arranged, and
   a microwave radiator,
   wherein the pre-heating unit comprises a pre-heating body and a glass substrate holder,
   wherein the molding unit comprises:
     a molding body having a vacuum port;
     a molding support on the molding body, the molding support being configured to support an edge of a glass substrate; and
     a heating element configured to heat the molding body, and
   wherein the cooling unit comprises a cooling body and a cooling plate, and
   wherein the molding support comprises:
     a support body on the molding body; and
     a dielectric heating layer on the support body, the edge of the glass substrate being mounted on the dielectric heating layer, the microwave radiator being configured to irradiate the dielectric heating layer to selectively heat the edge of the glass substrate.

2. The apparatus of claim 1, wherein the microwave radiator is disposed above the molding unit.

3. The apparatus of claim 2, wherein the microwave radiator is configured to generate microwaves having a frequency in a range of about 2.0 GHz to about 3.0 GHz.

4. The apparatus of claim 1, wherein the dielectric heating layer comprises at least one of a carbon black-based dielectric heating material and a silicon carbide-based dielectric heating material.

5. The apparatus of claim 1, further comprising:
   a transfer rail over the pre-heating unit, the molding unit, and the cooling unit and extending thereacross; and
   a transfer unit on the transfer rail.

6. The apparatus of claim 5, wherein the transfer unit comprises:
   a first transfer unit between the pre-heating unit and the molding unit; and
   a second transfer unit between the molding unit and the cooling unit.

7. The apparatus of claim 6, wherein each of the first transfer unit and the second transfer unit each comprises:
   an absorption jig having the vacuum port; and
   an absorption jig heater.

* * * * *